(12) United States Patent
Simpson

(10) Patent No.: US 7,874,141 B2
(45) Date of Patent: *Jan. 25, 2011

(54) AUXILIARY FLUID SOURCE FOR AN EGR PURGE SYSTEM

(75) Inventor: Stanley F. Simpson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 769 days.

This patent is subject to a terminal disclaimer.

(21) Appl. No.: 11/941,447

(22) Filed: Nov. 16, 2007

(65) Prior Publication Data

US 2009/0129914 A1   May 21, 2009

(51) Int. Cl.
*F02G 1/00* (2006.01)
*F02G 3/00* (2006.01)
*F02M 25/07* (2006.01)
*F02M 25/06* (2006.01)

(52) U.S. Cl. .................... 60/39.52; 60/39.12; 60/39.45; 60/605.2; 60/278; 123/568.12; 123/568.15

(58) Field of Classification Search ............... 60/605.2, 60/39.52, 274, 278–279, 286, 304, 310–311, 60/678, 772, 784, 781, 755, 649; 123/568.12, 123/568.15
See application file for complete search history.

(56) References Cited

U.S. PATENT DOCUMENTS

| | | | | |
|---|---|---|---|---|
| 4,121,912 A * | 10/1978 | Barber et al. | ............... | 60/39.12 |
| 4,799,461 A * | 1/1989 | Shigenaka et al. | ........... | 122/7 R |
| 5,096,470 A * | 3/1992 | Krishnamurthy | ............. | 95/102 |
| 5,526,641 A * | 6/1996 | Sekar et al. | ..................... | 60/274 |
| 5,592,925 A * | 1/1997 | Machida et al. | ................ | 60/311 |
| 5,649,517 A * | 7/1997 | Poola et al. | .................... | 60/274 |
| 5,657,630 A * | 8/1997 | Kjemtrup et al. | ............ | 60/605.2 |
| 5,669,365 A * | 9/1997 | Gartner et al. | ......... | 123/568.12 |
| 5,782,085 A * | 7/1998 | Steinwandel et al. | .......... | 60/274 |
| 5,894,719 A * | 4/1999 | Nalim et al. | ............... | 60/39.45 |
| 5,974,802 A * | 11/1999 | Blake | ......................... | 60/605.2 |
| 6,223,519 B1 * | 5/2001 | Basu et al. | ................. | 60/39.12 |
| 6,295,815 B1 * | 10/2001 | Bechle et al. | ............. | 60/605.2 |
| 6,301,888 B1 * | 10/2001 | Gray, Jr. | ..................... | 60/605.2 |
| 6,345,497 B1 * | 2/2002 | Penetrante | ................... | 60/303 |
| 6,470,682 B2 * | 10/2002 | Gray, Jr. | ..................... | 60/605.2 |
| 6,484,703 B1 * | 11/2002 | Bailey | ........................ | 60/605.2 |
| 6,526,753 B1 * | 3/2003 | Bailey | ........................ | 60/605.2 |
| 6,622,470 B2 * | 9/2003 | Viteri et al. | ................ | 60/39.52 |
| 6,637,183 B2 * | 10/2003 | Viteri et al. | ................ | 60/39.52 |

(Continued)

FOREIGN PATENT DOCUMENTS

DE    3418699 A1 * 11/1985

(Continued)

*Primary Examiner*—Thai Ba Trieu
(74) *Attorney, Agent, or Firm*—Dale J. Davis; Ernst G. Cusick; Frank A. Landgraff

(57) ABSTRACT

The exhaust within an exhaust gas recirculation (EGR) system should be purged to allow for access to the components of the EGR system. A system and method for purging the EGR system is provided. The system and method may incorporate a purge gas supply that may include: at least one pressurized cylinder, a storage tank, a compressor, or a benign fluid source. The system and method may drive the exhaust out of the EGR system.

14 Claims, 1 Drawing Sheet

U.S. PATENT DOCUMENTS

| | | | |
|---|---|---|---|
| 6,824,710 B2 * | 11/2004 | Viteri et al. | 60/39.461 |
| 6,910,335 B2 * | 6/2005 | Viteri et al. | 60/39.52 |
| 6,964,158 B2 * | 11/2005 | Abdul-Khalek | 60/278 |
| 7,094,036 B2 * | 8/2006 | Mennie et al. | 417/53 |
| 7,266,943 B2 * | 9/2007 | Kammel | 60/311 |
| 7,343,908 B2 * | 3/2008 | Lohmann | 123/568.15 |
| 7,349,792 B2 * | 3/2008 | Durand | 123/568.12 |
| 7,377,101 B2 * | 5/2008 | Mital et al. | 60/286 |
| 7,475,533 B2 * | 1/2009 | Hirata et al. | 60/286 |
| 7,536,252 B1 * | 5/2009 | Hibshman et al. | 60/605.2 |
| 2007/0277514 A1 * | 12/2007 | Kammel | 60/302 |
| 2008/0202101 A1 * | 8/2008 | Driscoll et al. | 60/286 |
| 2008/0309087 A1 * | 12/2008 | Evulet et al. | 60/39.52 |
| 2009/0188476 A1 * | 7/2009 | Sasajima et al. | 60/39.52 |
| 2009/0284013 A1 * | 11/2009 | Anand et al. | 60/39.52 |
| 2010/0107592 A1 * | 5/2010 | Botero et al. | 60/39.52 |

FOREIGN PATENT DOCUMENTS

| | | | |
|---|---|---|---|
| JP | 57073827 A | * | 5/1982 |
| JP | 2002332919 A | * | 11/2002 |

* cited by examiner

AUXILIARY FLUID SOURCE FOR AN EGR PURGE SYSTEM

This application is related to commonly-assigned U.S. patent application Ser. No. 11/928,038, filed Oct. 30, 2007; U.S. patent application Ser. No. 11/936,996, filed Nov. 8, 2007; and U.S. patent application Ser. No. 11/939,709, filed Nov. 14, 2007.

BACKGROUND OF THE INVENTION

The present invention relates to an exhaust gas recirculation (EGR) system for a turbomachine, and more particularly to a system for purging the exhaust gas from the EGR.

There is a growing concern over the long-term effects of Nitrogen Oxides (hereinafter NOx), Carbon Dioxide (hereinafter "$CO_2$") and Sulfur Oxides (SOx) emissions on the environment. The allowable levels of those emissions that may be emitted by a turbomachine, such as a gas turbine, are heavily regulated. Operators of turbomachines desire methods of reducing the levels of NOx, $CO_2$, and SOx emitted.

Significant amounts of condensable vapors exist in the exhaust gas stream. These vapors usually contain a variety of constituents such as water, organic and inorganic acids, aldehydes, hydrocarbons, sulfur oxides, and chlorine compounds. Left untreated, these constituents will accelerate corrosion and fouling of the internal components if allowed to enter the gas turbine.

Exhaust gas recirculation (EGR) generally involves recirculating a portion of the exhaust through an inlet portion of the turbomachine where it is mixed with the incoming airflow prior to combustion. This process facilitates the removal and sequestration of concentrated $CO_2$, and also reduces NOx emissions.

Access to the EGR system components may be necessary for maintenance, inspection, repair, or other purposes. The exhaust should be purged from the EGR system: prior to access; when the EGR system is not in use; or when the turbomachine is not generating exhaust. Furthermore, remnants of the exhaust that are not purged may condense within the EGR system leading to the corrosion of the components.

The costs associated with purging an EGR system typically vary with the type of EGR purge system used.

For the foregoing reasons, there is a need for a system and method for purging an EGR system. After use, the system should allow for access to the components of the ER system, and reduce the possibility of corrosion of the components. The EGR system should have few components and provide for a cost effective operation.

BRIEF DESCRIPTION OF THE INVENTION

In accordance with an embodiment of the present invention, a system for purging an exhaust stream from at least one exhaust gas recirculation (EGR) system, wherein the exhaust stream exits a turbomachine; the system comprising: at least one EGR system comprising: a first zone, a second zone; an EGR skid, an EGR inlet damper, and an EGR outlet damper; wherein the at least one EGR system reduces the level of constituents within the exhaust stream; an EGR purge system comprising: at least one first purge flow modulation device located within the first zone, at least one second purge flow modulation device located within the second zone, a purge vent; and a purge gas supply; wherein locations of the at least one first purge flow modulation device and the at least one second purge flow modulation device allows for a pressure balance within the EGR system; wherein the EGR purge system can establish a pressure drop between the EGR first zone and EGR second zone; and wherein the EGR purge system uses a benign fluid within the purge gas supply to purge the exhaust stream from the at least one EGR system.

In accordance with an alternate embodiment of the present invention, a method of purging an exhaust stream from at least one exhaust gas recirculation (EGR) system, wherein the exhaust stream exits a turbomachine; the method comprising: providing at least one EGR system comprising: a first zone, a second zone; an EGR skid, an EGR inlet damper, and an EGR outlet damper; wherein the at least one EGR system reduces the level of constituents within the exhaust stream; providing an EGR purge system comprising: at least one first purge flow modulation device located within the first zone, at least one second purge flow modulation device located within the second zone, a purge vent; and a purge gas supply; establishing a pressure balance within the EGR system between the at least one first purge flow modulation device and the at least one second purge flow modulation device; establishing a pressure drop between the first zone and second zone; and utilizing a benign fluid within the purge gas supply to purge the exhaust stream from the at least one EGR system.

DETAILED DESCRIPTION OF THE INVENTION

Figure 1:
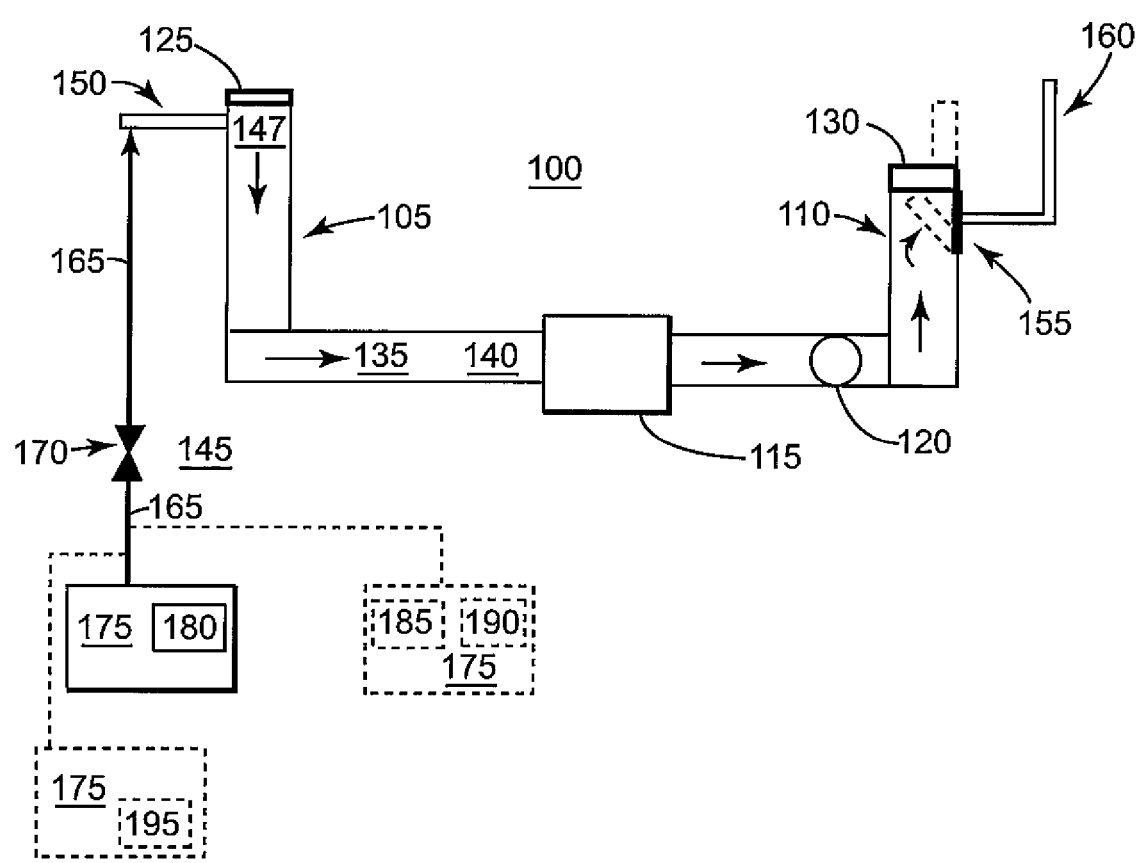
FIG. 1 is a schematic illustrating an example of a system for purging an exhaust stream in accordance with a first embodiment of the present invention.

The following detailed description of preferred embodiments refers to the accompanying drawings, which illustrate specific embodiments of the invention. Other embodiments having different structures and operations do not depart from the scope of the present invention.

Certain terminology may be used herein for the convenience of the reader only and is not to be taken as a limitation on the scope of the invention. For example, words such as "upper," "lower," "left," "right," "front", "rear" "top", "bottom", "horizontal," "vertical," "upstream," "downstream," "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

An EGR system receives a portion of the exhaust (hereinafter "exhaust stream") from a turbomachine, reduces the level of the aforementioned constituents within the exhaust stream, and then recirculates the exhaust stream to an inlet section of the turbomachine. This process facilitates a reduction in level of emissions within the exhaust stream and allows for the removal and sequestration of concentrated $CO_2$.

The exhaust stream in the EGR system should be purged when for example, but not limiting of: a) the EGR system may not be in use; b) the turbomachine has tripped or performed a fired shutdown; c) when an operator seeks to access the components of the EGR for repair, inspection, or maintenance; or d) for any other reason when the exhaust stream should be purged. An embodiment of the present invention has the technical effect of purging the exhaust stream from an EGR system. The exhaust stream existing within the EGR system may need to be purged for a variety reasons, such as, but not limiting of, when an operator may need to access the EGR system components for inspection, repair, service, or the like.

The present invention may be applied to the variety of turbomachines that produce a gaseous fluid, such as, but not limiting of, a heavy-duty gas turbine; an aero-derivative gas turbine; or the like. An embodiment of the present invention may be applied to either a single turbomachine or a plurality of turbomachines. An embodiment of the present invention may be applied to a turbomachine operating in a simple cycle or a combined cycle configuration.

Generally, the EGR purge system of an embodiment of the present invention comprises multiple elements. The configuration and sequence of the elements may be dictated by the configuration of the turbomachine integrated with the EGR system. In general, the EGR purge system displaces the exhaust stream in the EGR loop with a benign fluid, such as, but not limiting of, ambient air, compressed air, and nitrogen. As described below, there are multiple arrangements that may be used to accomplish the purging of the exhaust stream.

The present invention may provide the additional benefit of serving as a fire suppression system. Here, if the benign fluid 147 used with the EGR purge system is nitrogen, an operator may purge with nitrogen during a fire emergency occurring within the EGR system 100.

The elements of the present invention may be fabricated of any materials that can withstand the operating environment under which the EGR purge system may function and operate. These elements include for example, but not limiting of, a first purge flow modulation device, a second purge flow modulation device, a purge vent, and a purge gas supply.

Referring now to FIG. 1, which is a schematic illustrating an example of a system for purging an exhaust stream 135 in accordance with an embodiment of the present invention. FIG. 1 illustrates an EGR system 100, and an EGR purge system 145.

The EGR system 100, as illustrated in FIG. 1, comprises: a first zone 105, a second zone 110, an EGR skid 115, an EGR fan 120, an EGR inlet damper 125, a purge gas supply 175, and an EGR exhaust damper 130, that may be integrated with an exhaust section of a turbomachine (not illustrated in FIG. 1).

The at least one EGR system 100 may be of a size and fabricated of a material capable of withstanding the physical properties of the exhaust stream 135, such as, but not limiting of, a flowrate of about 1000 Lb/hr to about 50000000 Lb/hr and a temperature of about 50 Degrees Fahrenheit to about 1500 Degrees Fahrenheit.

The flow path 140 of the EGR system 100 may be bounded by an inlet section and exhaust section (not illustrated in FIG. 1). The first zone 105 may be considered the section of the EGR system 100 located near the inlet section of the turbomachine. The second zone 110 may be considered the section of the EGR system 100 located near the exhaust section of the turbomachine.

The EGR skid 115 generally includes the component (s) of the EGR system 100 that reduces the level of aforementioned constituents from the exhaust stream 135. These component (s) may include at least one heat exchanger, at least one scrubber, at least one demister, or similar components, (none of which are illustrated). The EGR fan 120 may circulate the exhaust during the operation of the EGR system 100.

Generally, during the operation of the EGR system 100, the EGR exhaust damper 130 may open to allow for the at least one exhaust stream 135 from the exhaust section of the turbomachine to enter the EGR second zone 110. Then the EGR skid 115 may reduce the level of constituents within the exhaust stream 135. Next, the EGR inlet damper 125 may open to allow for the recirculated exhaust stream 135 to enter the inlet section of the turbomachine.

The EGR system 100 should be purged when not in use, such as, but not limiting of, when the turbomachine is not producing exhaust gases. When the EGR system 100 is not in use, the inlet and exhaust dampers 115,120, may be shut; the EGR fan 120 may be off, and the EGR skid 115 may not be operating. These conditions may allow for the EGR system 100 to become a contained vessel, or the like, with the exhaust stream 135 inside. Therefore, the exhaust stream 135 should be purged from the EGR system 100.

The benefits of purging the EGR system 100 may include for example, but not limiting of, allowing for inspection, service, or repair of the aforementioned components within the EGR system 100. An EGR purge system 145 may include components that allow for the exhaust to leak out of the EGR system 100, thereby preventing the EGR system 100 from becoming a contained vessel when not in use.

Purging may also be beneficial for preventing corrosion from occurring within the EGR system 100. The exhaust stream 135 that remains within when the EGR system 100 is not in use, may eventually condense, possibly leading to an acid formation and/or liquid formation, within the EGR system 100.

The EGR purge system 145 may also be used when a failure of a component (s) prevents the circulation of the exhaust stream 135 within the EGR system 100. Here, the EGR purge system 145 may remove the exhaust stream 135 from the EGR system 100.

The EGR purge system 145, as illustrated in FIG. 1, comprises: at least one first purge flow modulation device 150, at least one second purge flow modulation device 155, at least one purge vent 160, a purge line 165, a purge line isolation device 170, and a purge gas supply 175.

The positioning of the EGR purge system 145 components may ensure that the flow path 135 as discussed, is purged. As illustrated in FIG. 1, the at least one first purge flow modulation device 150 may be located within the first zone 105; and the at least one second purge flow modulation device 155 may be located within the second zone 110. The locations of the at least one first purge flow modulation device 150 and the at least one second purge flow modulation device 155 may allow for the purging of the EGR system 100 flow path 140; and also allow for a pressure balance between the first and second zones 105,110.

The at least one first purge flow modulation device 150 and the at least one second purge flow modulation device 155, may be a damper, vent, or other similar device (s). In the embodiment of the present invention a portion of the first purge flow modulation device 150 may be integrated with the purge line 165. An opposite end of the purge line 165 may be integrated with the purge gas supply 175.

The purge isolation device 170 may be located on the purge line 165 and may prevent flow from the purge gas supply 175 to the first modulation device 150. The purge isolation device 170 may be a valve, or any other similar device capable of restricting the flow from the purge gas supply 175.

As discussed, the purge gas supply 175 generally includes a benign fluid 147 that is used to purge to the exhaust stream 135 from the EGR purge system 145. The benign fluid 147 may include, for example, but not limiting of: air, compressed air, compressed nitrogen, or combinations thereof. In an embodiment of the present invention, the benign fluid 147 may be stored in at least one pressurized cylinder 180.

In an alternate embodiment of the present invention, the benign fluid 147 may be stored in at least one storage tank 185, which may be integrated with a compressor 190. The compressor may drive the benign fluid 147 from the purge gas supply 175 to the first purge flow modulation device 150.

In another alternate embodiment of the present invention, the benign fluid 147 may flow, either directly or indirectly, from any other available benign fluid source 195. For example, but not limiting of, the benign fluid source 195 may include a liquid nitrogen tank (not illustrated) that may experience a boiling process, or the like; which converts the liquid nitrogen to a gaseous nitrogen. Alternatively, for example, but not limiting of, the benign fluid source 195 may include a compressed fluid gas line, located on site.

The purge vent 160 may be located in the second zone 110 and integrated with the second purge flow modulation device 155. A downstream end of the purge vent 160 may be open to the atmosphere. Alternatively, the downstream end of the purge vent 160 may be integrated with a system, such as, but not limiting of a ventilation system that may receive the exhaust being purged from the EGR system 100.

An alternate embodiment of the present invention may be used as a fire suppression system, or the like, for the EGR system 100. If nitrogen, or a similar fire suppression fluid, is used as the benign fluid, then the EGR purge system 145 may be used to aid in the extinguishing of a fire in the EGR system 100; in such an unlikely event.

In use, the EGR purge system 145 may function when either the turbomachine is not generating an exhaust that is flowing through the EGR system 100; or when the EGR system 100 in not in operation; or when a component(s) of the EGR system 100 fails; or during any time when an operator of the EGR purge system 145 decides.

Generally, when the EGR system 100 is not operating, the EGR inlet and outlet dampers 125, 130 may close; the components of the EGR skid 115 may be de-energized, and the EGR fan 120 may also be de-energized.

Under these (or similar) conditions, the EGR purge system 145 may begin operating. The at least one second purge flow modulation device 155 may modulate, allowing for a portion of the exhaust stream 135 to flow out of the flow path 140 through the purge vent 160. Next, the purge gas supply 175 may be prepared to deliver the benign fluid 147 through the purge line 165. Here, for example, but not limiting of, the at least one compressed cylinder storing the benign fluid 147 may be configured to allow the benign fluid 147 to enter the purge line 165. Alternatively, if the purge gas supply 175 includes a compressor and a storage tank containing the benign fluid 147, the compressor may be energized and configured to allow the benign fluid 147 to enter the purge line 165.

Next, the purge isolation device 170, may modulate to allow the benign fluid 147 to flow to the at least one first purge flow modulation device 150, which may then modulate, allowing for the benign fluid 147 to enter the flow path 140.

The purge gas supply 175 may create a pressure differential of from about 1 inches of water column to about 30 inches of water column within the flow path 140. This allows for a greater portion of the exhaust stream 135 to flow out the flow path 140.

Alternatively, an operator may close the second flow modulation device 155, and open the EGR exhaust damper 130. This may allow for the exhaust stream 135 to flow out of the exhaust section of the turbomachine (not illustrated).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of purging an exhaust stream from an exhaust gas recirculation (EGR) system, wherein the exhaust stream is generated by a gas turbine; the method comprising:
   providing the gas turbine comprising: an inlet, an external combustion system, and an exhaust section; wherein the gas turbine operatively produces an exhaust stream;
   providing the EGR system comprising: a first zone, a second zone; an EGR skid, an EGR inlet damper, and an EGR outlet damper; wherein the EGR system reduces the level of constituents within the exhaust stream and facilitates the sequestration and removal of the concentrated $CO_2$;
   providing an EGR purge system comprising: a first purge flow modulation device located within the first zone, a second purge flow modulation device located within the second zone, a purge vent; wherein the EGR purge system operatively uses a benign fluid to remove remnants of the exhaust stream remaining in the EGR system when the EGR system is not in operation;
   providing a purge gas supply that provides the benign fluid to the EGR purge system, wherein the purge gas supply comprises a purge line; and a purge line isolation device;
   establishing a pressure balance within the EGR system between the first purge flow modulation device and the second purge flow modulation device;
   wherein the operation of the purge gas supply establishes a pressure drop between the first zone and second zone as the EGR purge system operates; and
   utilizing a benign fluid within the purge gas supply to purge the exhausts stream from the EGR system.

2. The method of claim 1, further comprising the step of opening the purge line isolation device to establish the pressure drop between the first zone and the second zone in a range of from about 1 inches of water column to about 30 inches of water column.

3. The method of claim 2, wherein the pressure drop allows the benign fluid to drive the exhaust stream out of the EGR system through the purge vent.

4. The method of claim 1, wherein the benign fluid comprises at least one of: air, compressed air, nitrogen, or combinations thereof.

5. The method of claim 1, wherein the purge gas supply comprises at least one pressurized cylinder that stores the benign fluid.

6. The method of claim 1, wherein the purge gas supply further comprises a storage tank and at least one compressor that drives the benign fluid through the EGR purge system.

7. The method of claim 1, wherein the purge gas supply comprises a benign fluid source that provides the benign fluid.

8. A system for purging an exhaust stream from an exhaust gas recirculation (EGR) system, wherein the exhaust stream is generated by a gas turbine; the system comprising:

the gas turbine comprising: an inlet, an external combustion system, and an exhaust section; wherein the gas turbine operatively produces an exhaust stream;

the EGR system comprising: a first zone, a second zone; an EGR skid, an EGR inlet damper, and an EGR outlet damper; wherein the at least one EGR system reduces the level of constituents within the exhaust stream and facilitates the sequestration and removable of concentrated $CO_2$;

an EGR purge system comprising: a first purge flow modulation device located within the first zone, a second purge flow modulation device located within the second zone, a purge vent; wherein the EGR purge system operatively uses a benign fluid to remove remnants of the exhaust stream remaining in the EGR system when the EGR system is not in operation;

a purge gas supply that provides the benign fluid to the EGR purge system, wherein the purge gas supply comprises a purge line; and a purge line isolation device;

wherein the first zone of the first purge flow modulation device and the second zone of the second purge flow modulation device allows for a pressure balance within the EGR system as the EGR purge system operates; and wherein the EGR purge system operatively establishes a pressure drop between the EGR first zone and EGR second zone when a need to purge the EGR system of the exhaust stream exits.

9. The system of claim 1, wherein operatively opening the purge line isolation device establishes the pressure drop between the first zone and the second zone in a range of from about 1 inches of water column to about 30 inches of water column.

10. The system of claim 9, wherein the pressure drop allows the benign fluid to drive the exhaust stream out of the EGR system through the purge vent.

11. The system of claim 1, wherein the benign fluid comprises at least one of: air, compressed air, nitrogen, or combinations thereof.

12. The system of claim 1, wherein the purge gas supply comprises at least one pressurized cylinder that stores the benign fluid.

13. The system of claim 1, wherein the purge gas supply comprises a storage tank and at least one compressor that drives the benign fluid through the EGR purge system.

14. The system of claim 1, wherein the purge gas supply comprises a benign fluid source that provides the benign fluid.

* * * * *